US012621186B2

(12) United States Patent
Enderby et al.

(10) Patent No.: US 12,621,186 B2
(45) Date of Patent: May 5, 2026

(54) SWITCH MATRIX TOPOLOGY FOR ROUTING HIGH FREQUENCY SIGNALS

(71) Applicant: BAE SYSTEMS Information and Electronic Systems Integration Inc., Nashua, NH (US)

(72) Inventors: Randall T. Enderby, Derry, NH (US); Jake H. Rivard, Uxbridge, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 362 days.

(21) Appl. No.: 18/341,848

(22) Filed: Jun. 27, 2023

(65) Prior Publication Data

US 2025/0007755 A1 Jan. 2, 2025

(51) Int. Cl.
*H04L 12/50* (2006.01)

(52) U.S. Cl.
CPC .................................... *H04L 12/50* (2013.01)

(58) Field of Classification Search
CPC .... G01R 31/2844; H04L 49/10; H01H 67/24; H01L 23/5382; H01L 2924/0002; H01L 2924/00; H04Q 3/0012; H04Q 3/521; G06F 13/4022; G02B 6/262; G02B 6/3526; G02B 26/0833; G02B 26/0883; G02B 6/3554; G02B 6/3518; H03K 19/17744; H03K 17/56
See application file for complete search history.

(56) References Cited

U.S. PATENT DOCUMENTS

| | | | |
|---|---|---|---|
| 7,193,487 B2 | 3/2007 | Alexander et al. | |
| 7,205,864 B2 | 4/2007 | Schultz, Jr. et al. | |
| 7,285,487 B2 | 10/2007 | DeHon et al. | |
| 7,535,315 B2 | 5/2009 | Yarbrough, III et al. | |
| 8,081,966 B2 | 12/2011 | Nakazawa | |
| 9,157,952 B2 | 10/2015 | Becker et al. | |
| 9,548,778 B2 | 1/2017 | Bardy | |
| 9,622,108 B2 | 4/2017 | Gianvittorio | |
| 10,338,320 B2 * | 7/2019 | Way ........................ | G02B 6/356 |
| 11,550,104 B2 * | 1/2023 | Porter .............. | H03K 19/17744 |

(Continued)

FOREIGN PATENT DOCUMENTS

| | | |
|---|---|---|
| EP | 1014468 A2 | 6/2000 |
| WO | 2004047216 A2 | 6/2004 |

*Primary Examiner* — Jung Liu
(74) *Attorney, Agent, or Firm* — Gary McFaline

(57) ABSTRACT

A switch matrix structure for planar circuitry such as printed circuit boards and integrated circuits includes a plurality of signal dividers and a plurality of switches. Each signal divider is configured to receive a corresponding input signal and generate a corresponding plurality of divider output signals. Each switch is configured to receive a corresponding divider output from a corresponding signal divider. Each switch is configured to provide a corresponding output signal such that a plurality of output signals are generated by the plurality of switches. In an example, the plurality of switches are arranged in a column, with a first subset of the plurality of signal dividers on a first side of the column, and a second subset of the plurality of signal dividers on a second side of the column. In an example, such a routing configuration reduces a number of routing layers and/or a number of via transitions.

12 Claims, 7 Drawing Sheets

(56) References Cited

U.S. PATENT DOCUMENTS

| | | | | |
|---|---|---|---|---|
| 2006/0091972 A1* | 5/2006 | Schultz | .................... | H01P 1/10 |
| | | | | 333/104 |
| 2010/0307798 A1* | 12/2010 | Izadian | .................. | H01L 25/50 |
| | | | | 174/255 |
| 2012/0262008 A1* | 10/2012 | Becker | .............. | G01R 31/2844 |
| | | | | 29/622 |
| 2012/0262009 A1* | 10/2012 | Becker | .............. | G01R 31/2844 |
| | | | | 307/113 |
| 2021/0141158 A1* | 5/2021 | Porter | .................... | G02B 6/262 |
| 2022/0385377 A1 | 12/2022 | Wane et al. | | |

* cited by examiner

100

108d
108c     108b
108a

Legends
——— Layer 304a
------- Layer 304b

102

116
d

120a

106cd

106da     106ca     106dd 112
a     116
c     106bd     112
d 104a     106aa     106ba     106ad     104d

106da

121a 104b     106db     121     106cb     106dc
112
b     112
c     104c

106bb     116
b     106cc

106ab     106ac

106bc

120

124

116
a     120

122a

125c 125a     115     125b

125d y x 122a, 122b, 122c, 122d 104a     108a 104b     108b

Switch matrix 102

104c     108c 104d     108d

300

350

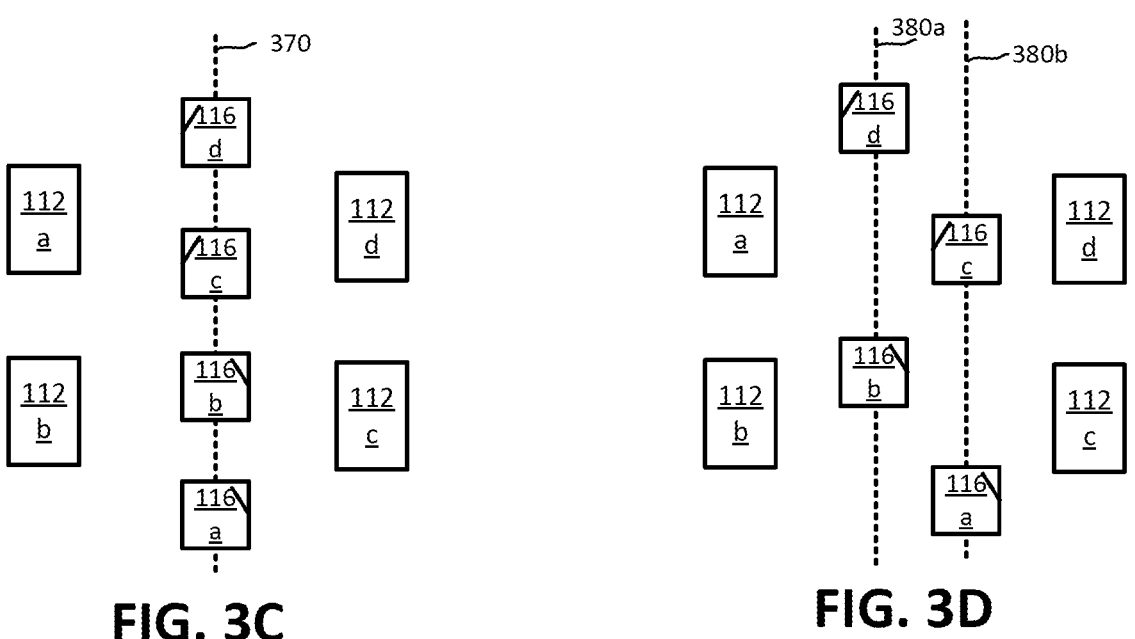
FIG. 3C
FIG. 3D
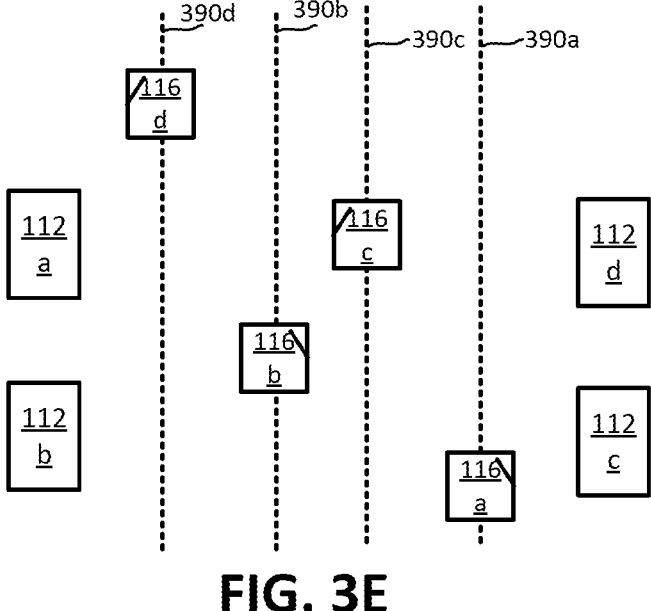
FIG. 3E

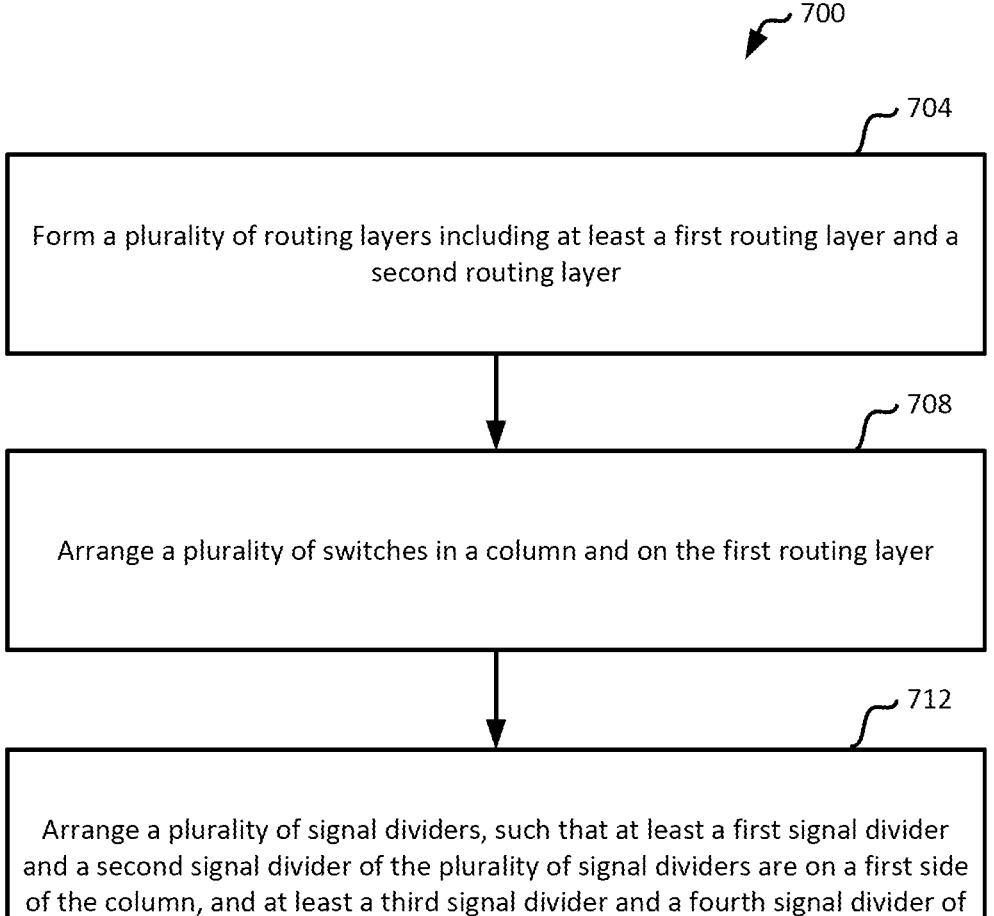

Form a plurality of routing layers including at least a first routing layer and a second routing layer Arrange a plurality of switches in a column and on the first routing layer Arrange a plurality of signal dividers, such that at least a first signal divider and a second signal divider of the plurality of signal dividers are on a first side of the column, and at least a third signal divider and a fourth signal divider of the plurality of signal dividers are on a second side of the column, wherein at least the first and third signal dividers are on the first routing layer, and at least the second and fourth signal dividers are on the second routing layer

FIG. 7

SWITCH MATRIX TOPOLOGY FOR ROUTING HIGH FREQUENCY SIGNALS

TECHNICAL FIELD

The present disclosure relates generally to switch matrix topology, and more particularly to switch matrix topology for routing high frequency signals, such as radio frequency (RF) signals and/or microwave signals.

BACKGROUND

Radio frequency (RF) signals are widely used in a number of applications. Often times, RF applications require reconfigurable routing of multiple input signals to various receivers (or multiple output signals to various transmitters). A switch matrix (SM) circuit may be employed to implement such reconfigurable routing of the RF signals. For example, a switch matrix circuit may include a plurality of inputs and a plurality of outputs, where any output may receive any of the input signal. In an example, to implement RF signaling of the switch matrix, a plurality of routing layers of a circuit board (such as a printed circuit board or PCB) may be used. There remain several non-trivial issues with respect to designing and forming routing layout for a switch matrix.

BRIEF DESCRIPTION OF THE DRAWINGS

FIG. 3C-3E illustrate various example arrangements of switches relative to signal dividers of a switch matrix, in accordance with an embodiment of the present disclosure.

FIG. 7 illustrates a flowchart depicting a method of forming a switch matrix (such as any of the switch matrices of FIGS. 1-6), in accordance with an embodiment of the present disclosure.

Figures 1, 2:
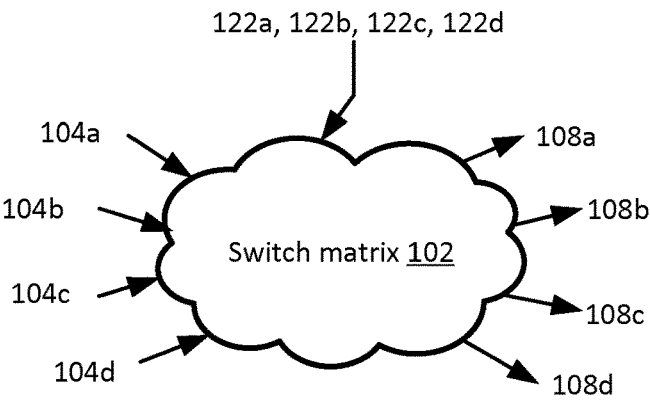
FIG. 1 illustrates a routing layout of a switch matrix having reduced number of routing layers and reduced via transitions between adjacent routing layers, in accordance with an embodiment of the present disclosure.
FIG. 2 illustrates an operation of the switch matrix, in accordance with an embodiment of the present disclosure.

The figures depict various embodiments of the present disclosure for purposes of illustration only and are not necessarily drawn to scale. Numerous variations, configurations, and other embodiments will be apparent from the following detailed discussion.

DETAILED DESCRIPTION

A switch matrix for routing signals is described herein. In an example, the switch matrix has a routing layout that reduces a number of routing layers and/or a number of via transitions used to implement the switch matrix, relative to a traditional switch matrix. The switch matrix may be used to route any type of signals, and may be especially advantageous to route radio frequency (RF) signals, where reducing a number of routing layers, reducing a number of via transitions, and/or reducing a number of cross-overs (e.g., where one RF line crosses over another signal line in close proximity to cause parasitic capacitance or cross-talk between those two lines) can substantially reduce RF signal losses. Because of the reduced number of routing layers, the reduced number of via transitions and/or reduced cross-overs, RF signal losses in the switch matrix is relatively lower, thereby increasing performance of the switch matrix. Furthermore, circuit board cost and complexity may also be reduced.

In an embodiment, a switch matrix for planar circuitry (such as a printed circuit board or integrated circuit), comprises a plurality of signal dividers, where each signal divider is configured to receive a corresponding input signal and generate a corresponding plurality of divider output signals. The switch matrix further includes a plurality of switches. In some examples, each switch is configured to receive a corresponding divider output from a corresponding signal divider, such that each switch receives a corresponding plurality of divider output signals from the plurality of signal dividers. In some such examples, each switch is configured to provide a corresponding output signal such that a plurality of output signals are generated by the plurality of switches. In some such examples, the plurality of switches are arranged in a column or group, with a first subset of the plurality of signal dividers on a first side of the column or group, and a second subset of the plurality of signal dividers on a second side of the column or group. More generally, the switches are arranged in the central region of a given switch matrix structure or are otherwise between subsets of signal dividers.

In another embodiment, a switch matrix comprises a plurality of routing layers including at least a first routing layer and a second routing layer. In an example, one of the first and second routing layers is an uppermost routing layer of the plurality of routing layers, and the other of the first and second routing layers is a lowermost routing layer of the plurality of routing layers. The switch matrix further includes a plurality of switches arranged in a column and on the first routing layer, and a plurality of signal dividers. In an example, a first signal divider and a second signal divider of the plurality of signal dividers are on a first side of the column, and a third signal divider and a fourth signal divider of the plurality of signal dividers are on a second side of the column. In an example, the first and third signal dividers are on the first routing layer, and the second and fourth signal dividers are on the second routing layer. In an example, the plurality of routing layers comprise a plurality of interconnect features to couple each switch of the plurality of switches of each signal divider of the plurality of signal dividers.

In yet another embodiment, a method of forming a switch matrix includes forming a plurality of routing layers including at least a first routing layer and a second routing layer, wherein one of the first and second routing layers is an uppermost routing layer of the plurality of routing layers, and the other of the first and second routing layers is a lowermost routing layer of the plurality of routing layers. The method further includes arranging a plurality of switches in a column and on the first routing layer, and arranging a plurality of signal dividers. In some examples, a first signal divider and a second signal divider of the plurality of signal dividers are on a first side of the column, and a third signal divider and a fourth signal divider of the plurality of signal dividers are on a second side of the column. In some such examples, the first and third signal dividers are on the first routing layer, and the second and fourth signal dividers are on the second routing layer. In an example, the plurality of routing layers comprise a plurality of interconnect features, such as conductive vias and conductive lines, to couple each switch of the plurality of switches of each signal divider of the plurality of signal dividers. Numerous variations and embodiments will be apparent in light of the present disclosure.

General Overview

As indicated above, there remain several non-trivial issues with respect to designing and forming routing layout for a switch matrix. In an example, due to the planar nature of a circuit board and the routing requirements of the switch matrix, a relatively large number of routing layers must be used to implement the RF signaling of the switch matrix, thereby increasing circuit board complexity and cost, as well as RF signal losses. Because one conductive trace cannot cross another conductive trace in close proximity, a switch matrix may require multiple routing layers of the circuit board for routing the signals of the switch matrix, to sufficiently space out the various RF signaling paths. In a switch matrix layout where the signal dividers are arranged on one side of the switch matrix structure and the switches are arranged on the other side of the switch matrix structure, the number of routing layers $N_L$ for implementing the switch matrix may be equal to a number of outputs $N_O$. Thus, with a switch matrix having four outputs, at least four routing layers are needed for routing the signals of the switch matrix. However, having such relatively large number of routing layers may increase signal losses for RF signals, as well as increase cost and complexity of the circuit board.

Accordingly, techniques are described herein to form a switch matrix for routing RF signals, where the switch matrix implements a routing layout topology that can be used to reduce a number of routing layers and/or a number of via transitions used to implement the switch matrix, as well as reduce parasitic cross-overs. Because of the reduced number of routing layers and/or the reduced number of via transitions, RF signal losses in the switch matrix is relatively lower, thereby increasing performance of the switch matrix. Furthermore, circuit board cost and complexity may also be reduced.

In one embodiment, the switch matrix may include a plurality of signal dividers. For example, a number of signal dividers may be equal to a number of input signals received by the switch matrix. Each signal divider divides or splits a corresponding input signal to multiple corresponding divider output signals that are substantial replica of the corresponding input signal. In an example, a signal divider may be a RF power divider.

For example, assume there are $N_i$ number of inputs and $N_O$ number of outputs of the switch matrix. Accordingly, there may be $N_i$ number of signal dividers respectively receiving the $N_i$ number of input signals. Also, each signal divider generates $N_O$ number of divider output signals.

Continuing with the above example, there may be $N_O$ number of switches. Each switch may be, for example, a single-pole-$N_O$-throw switch. For instance, where there are four outputs (e.g., $N_O$=4), each switch may be a single pole-4 throw (SP4T) switch. In one such example, each switch receives a corresponding divider output signal from each signal divider. Thus, each switch receives $N_i$ number of divider output signals from the $N_i$ number of signal dividers, and provides any of the $N_i$ number of divider output signals as its output signal, based on a corresponding control signal. Thus, any specific output of a switch (which is an output of the switch matrix) may be a divider output signal from any of the signal dividers. Because a divider output signal is a substantial replica of a corresponding input signal, any specific output of a switch (which is an output of the switch matrix) may be any of the input signals.

In some examples, in the routing layout of the switch matrix, the $N_O$ number of switches are arranged as a column of switches. For example, a straight imaginary line (or plane) may pass through two or more, such as all, the switches within the column. In another example, the $N_O$ number of switches are arranged as first and second columns of switches, to provide a grouped pattern where the switches of one column are offset in the horizontal and vertical directions from switches of the other column. More generally, the $N_O$ number of switches can be arranged as a group of switches within the central region of the switch matrix structure, so as to be between groups of signal dividers arranged at the edges of the switch matrix, and so as to allow access to each switch from multiple sides and directions.

Consider the example, for instance, where the $N_O$ number of switches are arranged as a single column of switches. The column of switches has six sides on six directions. In some example routing layouts, the signal dividers are arranged on two sides of a single column of switches, such as on a first side (or left side in FIGS. 1, 4-6) and a second side (or right side in FIGS. 1, 4-6). Thus, for example, the signal dividers are arranged on edges or periphery of the routing layout of the switch matrix, and the switches are arranged at or near a central section of the switch matrix. There may or may not be any signal divider of the switch matrix on any of the remaining four other sides of the column of switches, depending on routing needs of the application.

For example, if an even number of signal dividers are included in the switch matrix (such as four signal dividers in the example of FIG. 1), then half of the dividers can be on the first side of the column, and the other half of the dividers can be on the second side of the column of switches. In case odd number of dividers (e.g., N number of dividers, where N is an odd integer such as 3, 5, 7, or higher) are included in a switch matrix, then (N−1)/2 signal dividers may be on one of the first side or the second side of the column, and the remaining (N+1)/2 of the signal dividers may be on the other of the first side or the second side of the column of switches.

In such a routing layout (e.g., where the signal dividers are divided on two sides of a column or group of switches), a relatively reduced number of routing layers are needed to route the divider output signals from the various signal dividers to the various switches, along with relatively reduced number of via transitions (e.g., compared to a case where all signal dividers are on a same side of the switches). Moreover, parasitic cross-overs (e.g., where one routing line is sufficiently close to another routing line so as to cause interference) can be more easily avoided. Assume $N_L$ to be the number of routing layers, $N_O$ to be the number of output signals, and $N_i$ to be a number of the input signals $N_i$. In the routing layout describe above (e.g., where the signal dividers are divided on two sides of the column of switches), for $N_O=1$ or 2, $N_L=1$. Also, for $N_O \geq 2$, $N_L=\lceil N_i/2 \rceil$, where $\lceil \ldots \rceil$ represents the ceiling function of mathematics. The ceiling function maps "x" to the least integer greater than or equal to "x", denoted as $\lceil x \rceil$ or ceil(x). For example, if the number of outputs $N_O$ is four and the number of inputs $N_i$ is four, then the number of routing layers $N_L$ is $\lceil N_i/2 \rceil$, or two.

Thus, in the example routing layout described above (e.g., where the signal dividers are divided on two sides of a column of switches), a number of routing layers is substantially reduced, e.g., is reduced by about half, compared to the example in which all signal dividers are on a specific side of a column of switches. Similar benefits are readily achievable with two or three or more columns of switches, where each column is shifted laterally (to the left or right) from the other columns, so a straight imaginary line can pass through all the switches of any one column, so long as the columns are centrally located with respect to the signal dividers located to two or more sides of the switches.

It may be noted that the routing layout techniques described are particularly beneficial for routing of the RF signals, the techniques can be more generally used to route any type of signals.

In accordance with some embodiments of the present disclosure, these various approaches can be used individually or together to design and form routing layout of a switch matrix, and reducing number of routing layers and/or number of via transitions to implement the routing layout of the switch matrix.

As used herein, the term "about" indicates that the value listed may be somewhat altered or otherwise within an acceptable tolerance, as long as the alteration does not result in nonconformance of the process or device. For example, for some elements the term "about" can refer to a variation of ±0.1%, for other elements, the term "about" can refer to a variation of ±1% or ±10%, or any point therein. As also used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

As used herein, the term "substantially", or "substantial", is equally applicable when used in a negative connotation to refer to the complete or near complete lack of an action, characteristic, property, state, structure, item, or result. For example, a signal that is "substantially" the same as another signal would be either the same as the other signal, or so nearly the same as the other signal that any difference in signal characteristics are negligible for the given application.

Architecture

FIG. 1 illustrates a routing layout 100 of a switch matrix 102 having reduced number of routing layers and reduced via transitions between adjacent routing layers, in accordance with an embodiment of the present disclosure. FIG. 2 illustrates an operation of the switch matrix 102, in accordance with an embodiment of the present disclosure.

Referring to FIGS. 1 and 2, in an example, the switch matrix 102 receives a plurality of input signals 104a, . . . , 104d. In the example of FIGS. 1 and 2, the number of input signals 104a, . . . , 104d is four. However, the switch matrix 102 may receive a different number of input signals as well, such as two, three, five, or a higher number of input signals (e.g., see FIGS. 4-6 described below).

In an example, the switch matrix 102 generates a plurality of output signals 108a, . . . 108d. In the example of FIGS. 1 and 2, the number of output signals 108a, . . . , 108d is four.

However, the switch matrix 102 may generate a different number of output signals as well, such as two, three, five, or a higher number of output signals (e.g., see FIGS. 4-6 described below).

Furthermore, in the example of FIGS. 1 and 2, the number of input signals 104 and the number of output signals are the same, e.g., four. However, in other examples, the number of input signals 104 and the number of output signals 108 may be different (e.g., see FIGS. 4-6 described below).

In one embodiment, the switch matrix 102 may route any input signal 104 to any output signal 108. Merely as an example, input signal 104a may be routed and provided as output signal 108a, input signal 104a may also be routed and provided as output signal 108b, input signal 104d may be routed and provided as output signal 108c, and input signal 104c may be routed and provided as output signal 108d. Any other combination may also be possible. Put differently, the output signal 108a may comprise any of the input signals 104a, . . . , 104d, based on a control signal 122a; the output signal 108b may comprise any of the input signals 104a, . . . , 104d, based on a control signal 122b; the output signal 108c may comprise any of the input signals 104a, . . . , 104d, based on a control signal 122c; and the output signal 108d may comprise any of the input signals 104a, . . . , 104d, based on a control signal 122d. Thus, the switch matrix 102 may switch any of the input signals 104a, . . . , 104d to any of the output signals 108a, . . . , 108d, e.g., based on the control signals 122a, . . . , 122d.

In one embodiment, the input signals 104 and the output signals 108 are high frequency signals, such as radio frequency signals or microwave signals. For example, the frequency of the input signals 104 and the output signals 108 are in the mega-Hertz (MHz) or giga-Hertz (GHZ) range.

Referring now to FIG. 1, the switch matrix 102 comprises a plurality of signal dividers 112a, 112b, 112c, 112d, where each signal divider 112 (also generally referred to herein as dividers 112 in plural, and divider 112 in singular) is configured to receive a corresponding input signal 104. For example, the signal divider 112a receives the input signal 104a, the signal divider 112b receives the input signal 104b, and so on. Thus, a number of signal dividers 112 in the switch matrix 102 is equal to a number of the input signals 104, in an example.

Each signal divider 112 divides the corresponding input signal 104 into a number of divider output signals 106, where a number of divider output signals 106 output by each signal divider 112 is equal to a number of output signals 108. For example, the switch matrix 102 of FIG. 1 has four outputs 108a, . . . , 108d. Accordingly, each signal divider 112 divides the corresponding input signal 104 into four divider output signals 106.

For example, as illustrated in FIG. 1, the signal divider 112a divides the input signal 104a into divider output signals 106aa, 106ba, 106ca, and 106da; the signal divider 112b divides the input signal 104b into divider output signals 106ab, 106bb, 106cb, and 106db; the signal divider 112c divides the input signal 104c into divider output signals 106ac, 106bc, 106cc, and 106dc; and the signal divider 112d divides the input signal 104d into divider output signals 106ad, 106bd, 106cd, and 106dd.

A divided output signal 106 has substantially same characteristics as the corresponding input signal 104, e.g., is substantially a copy of the corresponding input signal 104. For example, the divided output signals 106aa, 106ba, 106ca, and 106da are substantially the same (e.g., substantially same phase and amplitude) as the corresponding input signal 104a; the divided output signals 106ab, 106bb, 106cb, and 106db are substantially the same (e.g., substantially same phase and amplitude) as the corresponding input signal 104b, and so on.

The switch matrix 102 further comprises a plurality of switches 116a, 116b, 116c, 116d. For example, a number of the switches 116a, . . . , 116d corresponds to a number of outputs of the switch matrix 102. For example, the switch matrix 102 has four outputs 108a, . . . , 108d, and hence, has four corresponding switches 116a, 116b, 116c, 116d.

As illustrated in FIG. 1, each switch 116 is configured to receive a corresponding divider output 106 from each of the signal dividers 112. For example, the switch 116a receives divider output 106aa from signal divider 112a, divider output 106ab from signal divider 112b, divider output 106ac from signal divider 112c, and divider output 106ad from signal divider 112d. Similarly, the switch 116b receives divider output 106ba from signal divider 112a, divider output 106bb from signal divider 112b, divider output 106bc from signal divider 112c, and divider output 106bd from signal divider 112d, and so on.

In one embodiment, each switch 116 is configured to output a corresponding output signal 108. For example, switch 116a outputs output signal 108a, switch 116b outputs output signal 108b, and so on. For example, each switch 116 switches one of the multiple divider outputs 106 received by the corresponding switch 116 as its corresponding output 108, based on the corresponding control signal 122. Thus example, the switches 116 are single pole-multiple throw switches, such as single pole—four throw (SP4T) switches in the example of FIG. 1, where each switch 116 has one output and four inputs. A control signal 122a controls the switching of the switch 116a, a control signal 122b controls the switching of the switch 116b, and so on.

For example, the switch 116a receives divider outputs 106aa, 106ab, 106ac, and 106ad, and switches any one of these divider output as its output 108a, e.g., based on the control signal 122a. Similarly, the switch 116b receives divider outputs 106ba, 106bb, 106bc, and 106bd, and switches any one of these divider output as its output 108b, e.g., based on a control signal 122b, and so on. Note that the control signal 122a for the switch 116a is illustrated in FIG. 1, and the control signals 122b, 122c, 122d provided to the switches 116b, 116c, 116d, respectively, are not illustrated in FIG. 1 for purposes of illustrative clarity.

During an operation of the switch matrix 102, and merely as an example, the control signals 122a, . . . , 122d may be configured such that the input signal 104a is to be routed and provided as output signal 108a, input signal 104a is also to be routed and provided as output signal 108b, input signal 104d is to be routed and provided as output signal 108c, and input signal 104c is to be routed and provided as output signal 108d. In such an example, the switch 116a may be controller by the control signal 122a, such that the switch 116a switches the divider output 106aa (which is a copy of the input signal 104a) as the output signal 108a.

Similarly, the switch 116b may be controller by the control signal 122b, such that the switch 116b may switch the divider output 106ba (which is a copy of the input signal 104a) as the output signal 108b. Also, the switch 116c may be controller by the control signal 122c, such that the switch 116c may switch the divider output 106cd (which is a copy of the input signal 104d) as the output signal 108c. Also, the switch 116d may be controller by the control signal 122d, such that the switch 116d may switch the divider output 106dc (which is a copy of the input signal 104c) as the output signal 108d. Thus, the switch matrix 102 may switch any of the input signals 104a, . . . , 104d to any of the output signals 108a, . . . , 108d, e.g., based on the control signals 122a, . . . , 122d.

In one embodiment, each switch 116 receives various low frequency or direct current (DC) signals, such as the control signals 122 described above, power signals 124 for powering or biasing the switch, and so on. For example, the power signal 124 to the switch 116a is illustrated in FIG. 1, and the power signal 124 to various other switches 116b, . . . , 116d are not illustrated for purposes of illustrative clarity.

In an example, the switch matrix 102 is part of a printed circuit board (PCB), or a printed wiring board (PWB), or an integrated circuit structure. For instance, in the context of a PCB or PWB, switch 116 and/or each divider 112 may be implemented as an integrated circuit die or a surface mount component mounted on a corresponding PCB or PWB surface or integrated within a corresponding layer of such a board. In the context of an integrated circuit, switch 116 and/or each divider 112 may be implemented as devices integrated within a corresponding layer of such an integrated circuit. The example of FIG. 1 illustrates the physical locations or physical layout of the switches 116 and the signal dividers 112 within the switch matrix structure, and the routing layout of the signals to and/or from the switches and signal dividers. Thus, in addition to being a circuit diagram, FIG. 1 is also a diagram (such as a plan or top-down view) of a physical routing layout 100 of the switch matrix 102.

For example, the switches 116a, . . . , 116d are arranged as a column 115 of switches (such as a single column 115 of switches). For example, a straight imaginary line may pass through two or more, such as all, the switches 116a, . . . , 116d within the column 115. More generally, the switches 116a, . . . , 116d are located between a first set of dividers (e.g., 112a-b) and a second set of dividers (e.g., 112c-d). By placing inputs (e.g., dividers) on edges or the switch matrix structure, and the outputs (e.g., switches) in the center of the switch matrix structure or otherwise between the inputs, more routing on similar layers without crossing any signal paths can be accomplished. This is in contrast to a scheme where all inputs are located on one side of the switch matrix structure, and all outputs on the other side.

As illustrated in FIG. 1, the column 115 has six sides, such as a first or left side 125a, a second or right side 125b opposite the first side 125a, a third side 125c perpendicular to the first side 125a, a fourth side 125d opposite the third side 125c, a fifth side that is above the plane of the page on which the figure is drawn, and a sixth side that is below the plane of the page on which the figure is drawn (where the fifth and sixth sides are not labelled in FIG. 1).

In one embodiment, in the routing layout 100 of the switch matrix 102, the dividers 112 are arranged on two sides of the column 115, such as on the first (or left) side 125a and the second (or right) side 125b, as illustrated in FIG. 1. Thus, for example, the dividers 112 are arranged on edges or periphery of the routing layout 100 of the switch matrix 102, and the switches 116 are arranged at or near a central section of the switch matrix 102. As illustrated in FIG. 1, there are no dividers on the four other sides (e.g., other than the first and second sides 125*a*, 125*b*) of the column 115.

For example, if even number of dividers 112 are included in the switch matrix 102 (such as four dividers in the example of FIG. 1), then half of the dividers 112*a*, 112*b* are on the first side 125*a* of the column 115, and the other half of the dividers 112*c*, 112*d* are on the second side 125*b* of the column 115.

In case odd number of dividers 112 (e.g., N number of dividers, where Nis an odd integer such as 3, 5, 7, or higher) are included in a switch matrix 102, then (N−1)/2 dividers 112 may be on one of the first side 125*a* or the second side 125*b* of the column 115, and the remaining (N+1)/2 of the dividers 112*c*, 112*d* may be on the other of the first side 125*a* or the second side 125*b* of the column 115. Thus, in this example, the number of dividers on the first side 125*a* and the number of dividers on the second side 125*b* of the column may differ by at most one. In one embodiment, the number of dividers on the first side 125*a* and the number of dividers on the second side 125*b* of the column 115 may differ by at most one, or at most two, or at most three.

There are several advantages of the above described layout of the dividers 116 on the two sides 125*a*, 125*b* and the column 115 of the switches 116 on the center, as will be described herein below.

FIG. 1 illustrates a single column 115 of switches 116. However, the switches 116 may be arranged in more than one column. FIG. 3C-3E illustrate various example arrangements of the switches 116 relative to the signal dividers 112 of a switch matrix 102, in accordance with an embodiment of the present disclosure. The routing of various signals is not illustrated in FIGS. 3C-3E, for purposes of illustrative clarity.

For example, FIG. 3C illustrates the switches 116*a*, . . . , 116*d* being arranged in a single column, such that a single imaginary line 370 (or a plane) passes through the switches 116*a*, . . . 116*d*, as described with respect to FIG. 1. As also illustrated in FIG. 1, in FIG. 3C some of the signal dividers 112 are on a first side of the group of switches 116*a*, . . . , 116*d*, and some other of the signal dividers 112 are on a second side of the group of switches 116*a*, . . . , 116*d*.

In FIG. 3D, the switches 116*a*, . . . , 116*d* are arranged in two columns, such that an imaginary line 380*a* (or a plane) passes through the switches 116*d* and 116*b*, and another imaginary line 380*b* (or a plane) passes through the switches 116*c* and 116*a*. As also illustrated in FIG. 3D, some of the signal dividers 112 are on a first side of the group of switches 116*a*, . . . , 116*d*, and some other of the signal dividers 112 are on a second side of the group of switches 116*a*, . . . , 116*d*.

In FIG. 3E, the switches 116*a*, . . . , 116*d* are arranged in a group or cluster and not in columns, such that each of imaginary lines 390*a*, 390*b*, 390*c*, 390*d* passes through a corresponding one of the switches 116*a*, . . . , 116*d*. As also illustrated in FIG. 3E, some of the signal dividers 112 are on a first side of the group of switches 116*a*, . . . , 116*d*, and some other of the signal dividers 112 are on a second side of the group of switches 116*a*, . . . , 116*d*.

Figure 3A:
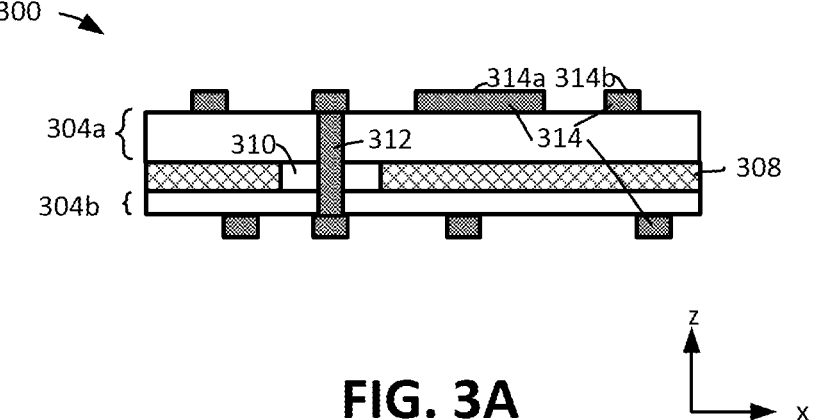
FIG. 3A illustrates a planar circuit structure comprising a plurality of routing layers including a plurality of interconnect features (such as conductive vias and conductive lines), wherein the interconnect features route various signals of the switch matrix of FIGS. 1 and 2, in accordance with an embodiment of the present disclosure.
Figure 3B:
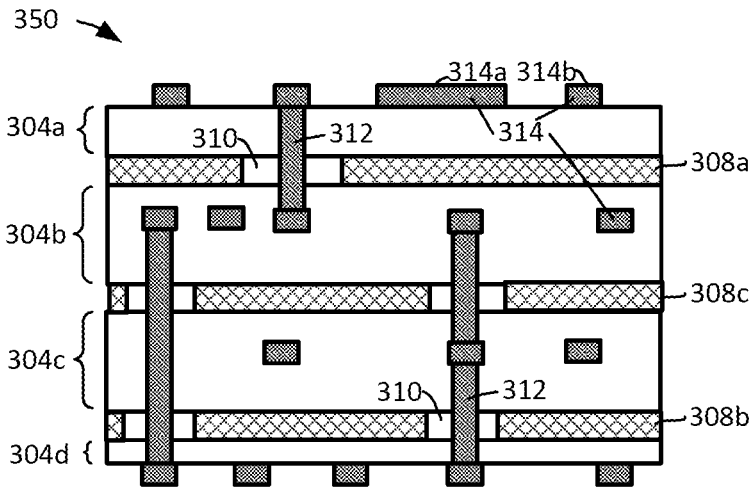
FIG. 3B illustrates another planar circuit structure that is at least in part similar to the planar circuit structure of FIG. 3A, where the planar circuit structure of FIG. 3B has a higher number of routing layers than the planar circuit structure of FIG. 3A, in accordance with an embodiment of the present disclosure.

In one embodiment, the divider output signals 106*aa*, . . . , 106*dd* and/or the output signals 108*a*, . . . , 108*d* are routed by a plurality of interconnect features, such as conductive vias and conductive lines that are extend through a plurality of routing layers. FIG. 3A illustrates planar circuit structure 300 comprising a plurality of routing layers 304*a*,

304*b* including a plurality of interconnect features 312 and 314 (such as conductive vias and conductive lines), wherein the interconnect features 312 and 314 route various signals of the switch matrix 102 of FIGS. 1 and 2, in accordance with an embodiment of the present disclosure. FIG. 3B illustrates another planar circuit structure 350 that is at least in part similar to the planar circuit structure 300 of FIG. 3A, where the planar circuit structure 350 of FIG. 3B has a higher number of routing layers 304*a*, 304*b*, 304*c*, 304*d* than the planar circuit structure 300 of FIG. 3A, in accordance with an embodiment of the present disclosure.

Thus, FIGS. 3A and 3B illustrate two different example planar circuit structures, each having corresponding number of routing layers. For example, the switch matrix 102 having the four input signals 104*a*, . . . , 104*d* and four output signals 108*a*, . . . , 108*d* can be implemented using two routing layers, such as routing layers 304*a* and 304*b* of FIG. 3A.

Referring to FIGS. 3A and 3B, each routing layer 304 comprises a corresponding dielectric material, and a plurality of conductive lines 314 and a plurality of conductive vias 312 (although only one such via 312 is illustrated in FIG. 3A) extending within the corresponding dielectric material. In one embodiment, the routing layers of FIGS. 3A and 3B may be implemented in a planar circuit board, such as a printed circuit board (PCB) or a printed wiring board (PWB). In another embodiment, the routing layers of FIGS. 3A and 3B may be implemented in an integrated circuit.

The conductive lines 314 extend in the horizon direction, e.g., in the plane of the x and y axis of FIGS. 3A and 3B. Merely as an example, in FIG. 3A, a conductive line 314*a* is illustrated to extend in the x axis direction, across the width of the paper in which FIG. 3A is drawn. Another a conductive line 314*b* is illustrated to extend in the y axis direction, in and out of the paper in which FIG. 3A is drawn.

FIGS. 3A and 3B also illustrate conductive vias 312 extending in vertical or z-axis direction. For example, a conductive via 312 couples two conductive lines in two different routing layers. Thus, a via 312 facilitates inter-routing layer transition, also referred to herein as via transition. For example, a via transition results in an interconnect feature extending between two adjacent routing layers.

As discussed, the input signals 104, the divider output signals 106, and the output signals 108 of FIG. 1 are RF signals having relatively high frequency. In an example, to avoid interference of signals among two routing layers and/or to reduce losses, each routing layer 304 is separated from an adjacent routing layer by a corresponding ground plane 308. For example, a single ground plane 308 is illustrated in FIG. 3A, and three ground planes 308*a*, 308*b*, 308*c* are illustrated in FIG. 3B. In an example, each ground plane 308 comprises a plane of conductive material, such as one or more metals and/or alloys thereof. In an example, a ground plane 308 comprises a metal plate or metal divider spanning in a horizontal plane between adjacent routing layers. In an example, a ground plane may, or may not, be on a lower surface of a lowermost routing layer and/or on an upper surface of an uppermost routing layer, although FIGS. 3A and 3B doesn't illustrate such a ground plane.

As illustrated in FIGS. 1 and 2, a conductive via 312 transitioning between two routing layers 304*a* and 304*b* has to pass through an opening within the ground plane 308*b* between the two routing layers 304*a* and 304*b*. For example, the ground plane 308*b* has an opening 310, through which the via 312 passes or extends, without contacting the ground plane 308*b*, as illustrated in FIGS. 3A and 3B.

In one embodiment, because of the high frequency nature of the signals routed by the interconnect features of the routing layers 304a, 304b, transitions between two routing layers 304a, 304b using a via 312, such as extending the via 312 through a ground plane 308, incurs some loss of signal strength. Thus, via transitions may be lossy in nature, and a higher number of such via transitions results in greater loss. For example, the via transitions are not impedance matched, and each via transition results in some corresponding loss in the signal strength. Also, a switch matrix 102 is likely to include several such via transitions, and a combination of such losses associated with the transition of the vias between adjacent routing layers and through the ground planes 308 can be significant.

As will be described below, in one embodiment, due to the layout of the switch matrix 102 illustrated in FIG. 1 (e.g., by arranging the switches in a column 115, and the signal dividers on two sides of the column of switches), a number of routing layers for implementing the switch matrix 102, as well a number of such via transitions, are minimized or at least reduced. For example, the number of routing layers and/or the number of via transitions used to implement the switch matrix 102 are optimal or sub-optimal, or at least reduced, resulting in relatively less loss of signal strength in the switch matrix 102.

Figure 3B:

Referring again to FIG. 1, some of the signal lines for routing the divider output signals 106 are illustrated using solid lines, while some other signal lines for routing the divider output signals 106 are illustrated using dotted lines. As indicated in the legends section of FIG. 1, the solid lines extend through a first routing layer, such as the routing layer 304a of FIG. 3A; and the dotted lines extend through a second routing layer, such as the routing layer 304b of FIG. 3A. For example, as described below, the switch matrix 102 of FIG. 1 may be implemented using only two routing layers, such as the routing layers 304a and 304b of FIG. 3.

Also, the dividers 112a and 112d are illustrated using solid lines, and the dividers 112b and 112c are illustrated using dotted lines, to indicate that the dividers 112a and 112d are on or above the routing layer 304a (e.g., mounted on or above the routing layer 304a), and the dividers 112b and 112c are on or below the routing layer 304c (e.g., mounted on or below the routing layer 304b). Similarly, the switches 116a, 116b, 116c, 116d are illustrated using solid lines, indicating that the switches 116a, 116b, 116c, 116d are on or above the routing layer 304a.

For example, the dividers 112a and 112d and the switches 116a, 116b, 116c, 116d may be surface mounted components or integrated circuit dies that are mounted on or above the routing layer 304a of FIG. 3A. Similarly, the dividers 112b and 112c may be surface mounted components or integrated circuit dies that are mounted on or below the routing layer 304b of FIG. 3A. In other examples, the dividers 112a and 112d and/or the switches 116a, 116b, 116c, 116d may be semiconductor devices that are formed on or above the routing layer 304a, and the dividers 112b and 112c may be semiconductor devices that are formed on or below the routing layer 304a of FIG. 3A. In yet other examples, dividers 112a and 112d may comprise passive components.

Because the dividers 112a and 112d are on the routing layer 304a, the input signals 104a and 104d are routed to the dividers 112a and 112d through the routing layer 304a, as illustrated using solid lines in FIG. 1. Also, as the divider 112a and the switches 116a, . . . , 116d are all on the routing layer 304a, the divider output signals 106aa, 106ba, 106ca, and 106da are routed from the divider 112a to the switches 116a, . . . , 116d, respectively, through the routing layer 304a, as illustrated using solid lines in FIG. 1.

Similarly, as the divider 112d and the switches 116a, . . . , 116d are all on the routing layer 304a, the divider output signals 106ad, 106bd, 106cd, and 106dd are routed from the divider 112d to the switches 116a, . . . , 116d, respectively, through the routing layer 304a, as illustrated using solid lines in FIG. 1.

However, the divider 112b is on the routing layer 304b and the switches 116a, . . . , 116d are on a different routing layer 304a. Accordingly, the divider output signals 106ab, 106bb, 106cb, and 106db are initially output in the routing layer 304b. For example, the divider output signals 106ab, 106bb, 106cb, and 106db being output by the divider 112b are illustrated using dotted lines. However, the divider output signals 106ab, 106bb, 106cb, and 106db received by the switches 116a, . . . , 116d, respectively, have to be in the routing layer 304a, as illustrated using solid lines.

Accordingly, for each of the divider output signals 106ab, 106bb, 106cb, and 106db, there is a corresponding via transition 120 from the routing layer 304b to the routing layer 304a. A via transition 120, as described above, implies that a via 312 transitions a signal from one routing layer to an adjacent routing layer. A specific example via transition 120 is labelled as 120a in FIG. 1. Thus, at the via transition 120a, the divider output signals 106db transitions from the routing layer 304b (illustrated using dotted line) to the routing layer 304a (illustrated using solid line), as illustrated in FIG. 1.

Thus, each of the divider output signals 106ab, 106bb, 106cb, and 106db from the divider 112b, and each of the divider output signals 106ad, 106bd, 106cd, and 106dd from the divider 112d undergoes a via transition, as illustrated by a transition of dotted-to-solid line in FIG. 1.

Similarly, output signals 108a, . . . , 108d output by the switches 116a, . . . , 116d, respectively, are initially routed through routing layer 304a (solid line), as the switches 116a, . . . 116d are on the routing layer 304a. However, in the example of FIG. 1, the output signals 108a, . . . 108d may be accessed from routing layer 304b. Accordingly, each of the output signals 108a, . . . 108d also include corresponding via transitions 120, from routing layer 304a (solid line) to routing layer 304b (dotted line).

Note that the routing layout 100 of FIG. 1 is an actual layout of various signal lines and components of the switch matrix 102, in addition to being a circuit diagram of the switch matrix 102. The routing layout 100 also includes crossing of two lines (also referred to herein as cross-overs), generally labelled as cross-overs 121. However, in each cross-over, the two signal lines that cross each other are in different routing layers, and hence, are not electrically shorted (note that the ground plane 308 between the two routing layers prevents, or at least reduces, interference between the two crossed signal lines carrying high frequency signals, see FIGS. 3A and 3B). For example, a specific cross-over labelled as 121a shows a cross-over between a signal line 106cc in the routing layer 304b (dotted line) and a signal line 106ad in the routing layer 304a (dotted line).

In one embodiment, arranging the dividers 112 on two sides of the column 115 of the switches 116 (e.g., arranging the dividers 112 on edges or periphery of the routing layout 100 and the switches 116 at or near a central section of the routing layout 100) reduces a number of routing layers for implementing the switch matrix 102, as well as reduces a number of via transitions 120. This results in relatively less loss of signal strength in the switch matrix 102.

For example, if the dividers 112a, . . . , 112d were arranged on only one side of the column of switches 116a, . . . , 116d, then four routing layers would have been needed to effectively route the divider output signals 106 from the various dividers 112 to the various switches 116. Also, such an arrangement would have resulted in relatively greater number of via transitions. For example, in such a routing layout (e.g., where the dividers are on only one side of the switches), a number of routing layers $N_L$ may be equal to a number of outputs $N_O$, where $N_O$ is four in the switch matric 102. Thus, in such a routing layout (e.g., where the dividers are on only one side of the switches):

$$N_L = N_O \qquad \text{Equation 1}$$

However, in the routing layout 100 illustrated in FIG. 1 and described above, reduced number of routing layers are needed to route the divider output signals from the various dividers 112 to the various switches 116, along with relatively smaller number of via transitions. In an example, in the routing layout of the switch matrix described herein (e.g., where the dividers are divided on two sides of the column of switches), the number of routing layers $N_L$, the number of output signals $N_O$, and a number of the input signals $N_i$ are related as follows:

$$N_L = 1, \text{ for } N_O = 1, 2 \qquad \text{Equation 2}$$

$$N_L = \lceil N_i/2 \rceil, \text{ for } N_O \geq 2 \qquad \text{Equation 3}$$

Note that $\lceil \ldots \rceil$ represents the ceiling function.

Thus, for the switch matrix 102, the number of outputs $N_O$ is four and the number of inputs $N_i$ is also four, and hence, in accordance with equation 3, the number of routing layers $N_L$ is $\lceil N_i/2 \rceil$, or two. Accordingly, in FIG. 1, two routing layers 304a and 304b are sufficient to route RF signals of the switch matrix 102, such as the divider output signals 106, the input signals 104, and the output signals 108.

Note that the routing layout 100 of FIG. 1 (as well as routing layouts 400, 500, and 600 described below) illustrate routing of the RF signals, such as the divider output signals 106, the input signals 104, and the output signals 108. Although FIG. 1 illustrates non-RF signals, such as control signals 122 and DC power/biasing signals 124, routing of such low frequency or DC signals are not illustrated in the routing layout 100 (as well as subsequent routing layouts 400, 500, and 600 described below). This is because a number of routing layers and/or a number of via transitions are critical for RF signals, as a relatively greater number of routing layers and/or via transitions can result in higher loss for RF signals, but may not significantly affect DC or low frequency signals. Accordingly, the low frequency or DC signals (such as the control signals 122 and/or DC power/biasing signals 124) may be routed using a plurality of routing layers, at least some of which may be same as (or different from) the routing layers used for routing RF signals (e.g., the routing layers of FIGS. 3A and 3B). Because the number of routing layers and/or the number of via transitions are relatively less critical for low frequency or DC signals (e.g., compared to that of the RF signals), the routing of the low frequency or DC signals may be designed using available techniques for designing routing layouts for such low frequency or DC signals.

Figure 4:
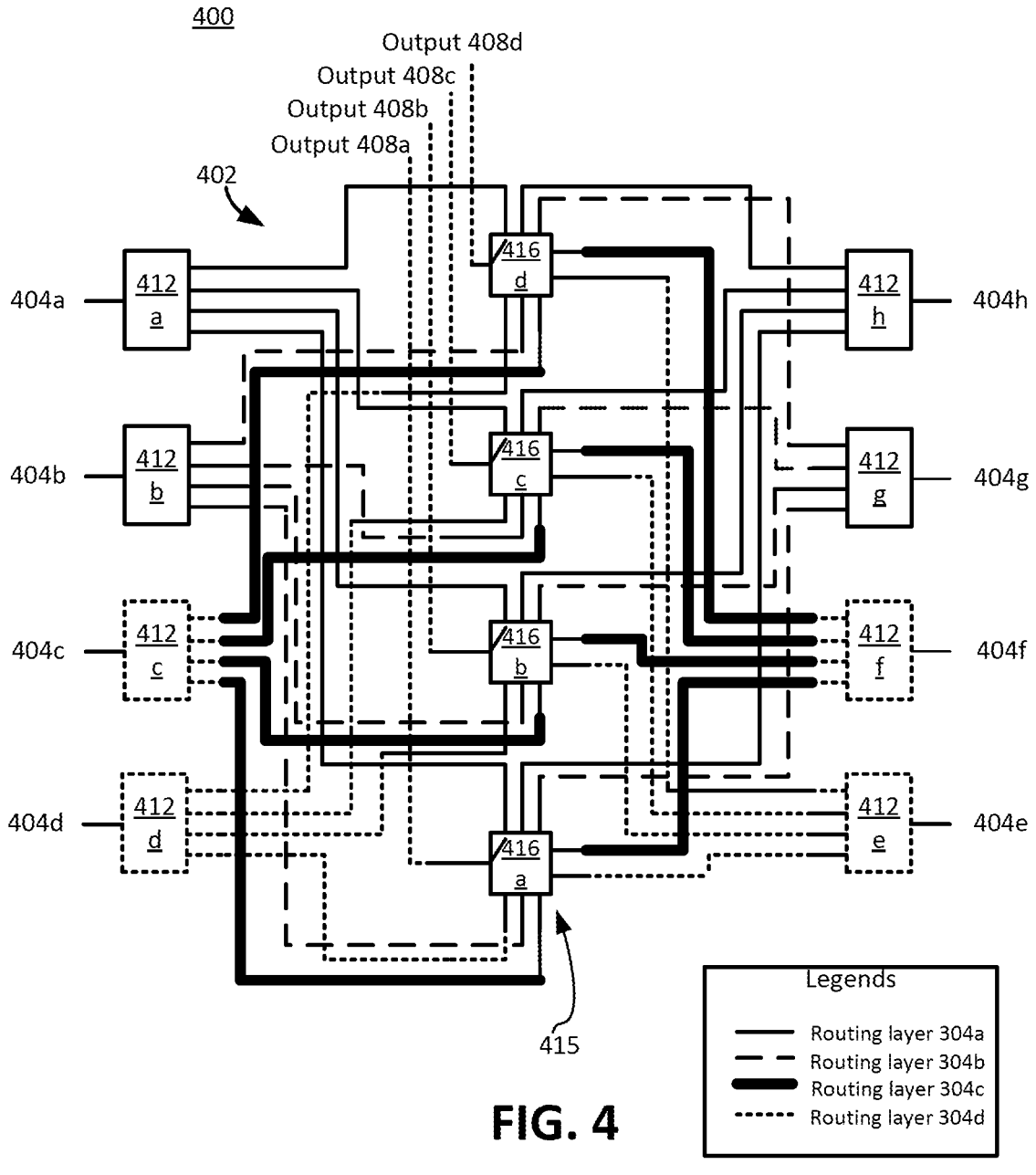
FIG. 4 illustrates a routing layout of an example switch matrix having eight input signals, four output signals, and four routing layers, in accordance with an embodiment of the present disclosure.

FIG. 4 illustrates a routing layout 400 of an example switch matrix 402 having eight input signals 404a, . . . , 404h, four output signals 408a, . . . , 408d, and four routing layers, in accordance with an embodiment of the present disclosure. Similar to the routing layout of FIG. 1, in the routing layout 400, the signal dividers 412a, . . . , 412h are arranged on two sides of a column 415 of the switches 416a, . . . , 416d, such that some dividers 412a, . . . , 412d are on a first or left side of the switches 416a, . . . , 416d, and the remaining dividers 412e, . . . , 412h are on a second or right side of the switches 416a, . . . , 416d. Thus, for example, the dividers 412 are arranged on edges or periphery of the routing layout 400 of the switch matrix 402, and the switches 416 are arranged at or near a central section of the switch matrix 402.

In the switch matrix 402, the number of outputs $N_O$ is four, and the number of inputs $N_i$ is eight. Thus, in accordance with equation 3 described above, the number of routing layers $N_L$ to be used may be at least $\lceil 8/2 \rceil$, or 4. Thus, at least four routing layers may be used for routing the RF signals (such as the divider output signals, the input signals, and the output signals) of the switch matrix 400.

As illustrated in the legends section of FIG. 4, signal lines extending through a first routing layer (such as routing layer 304a of FIG. 3B) are illustrated using solid lines, signal lines extending through a second routing layer (such as routing layer 304b of FIG. 3B) are illustrated using dashed lines, signal lines extending through a third routing layer (such as routing layer 304c of FIG. 3B) are illustrated using thick solid lines, and signal lines extending through a fourth routing layer (such as routing layer 304d of FIG. 3B) is illustrated using dotted lines.

Note that although there are more than two routing layers (such as four routing layers) in the routing layout 400 of FIG. 4, individual ones of the dividers 412 and the switches 416 can be either on an uppermost routing layer or a lowermost routing layer. For example, the dividers 412a, 412b, 412g, 412h and the switches 416a, . . . , 416d are on the uppermost routing layer 304a, and the dividers 412c, 412d, 412e, and 412f are on the lowermost routing layer 304d.

Thus, although the dividers 412a, 412b, 412c, 412d are on the same left side of the column of switches 416, all the dividers 412a, 412b, 412c, 412d are not on the same horizontal plane. For example, the dividers 412a, 412b are on a horizontal plane above the uppermost routing layer, and the dividers 412c, 412d are on another horizontal plane below the uppermost routing layer. The routing layout 400 of FIG. 4 will be apparent, based on the description above with respect to FIGS. 1-3.

Figure 5:
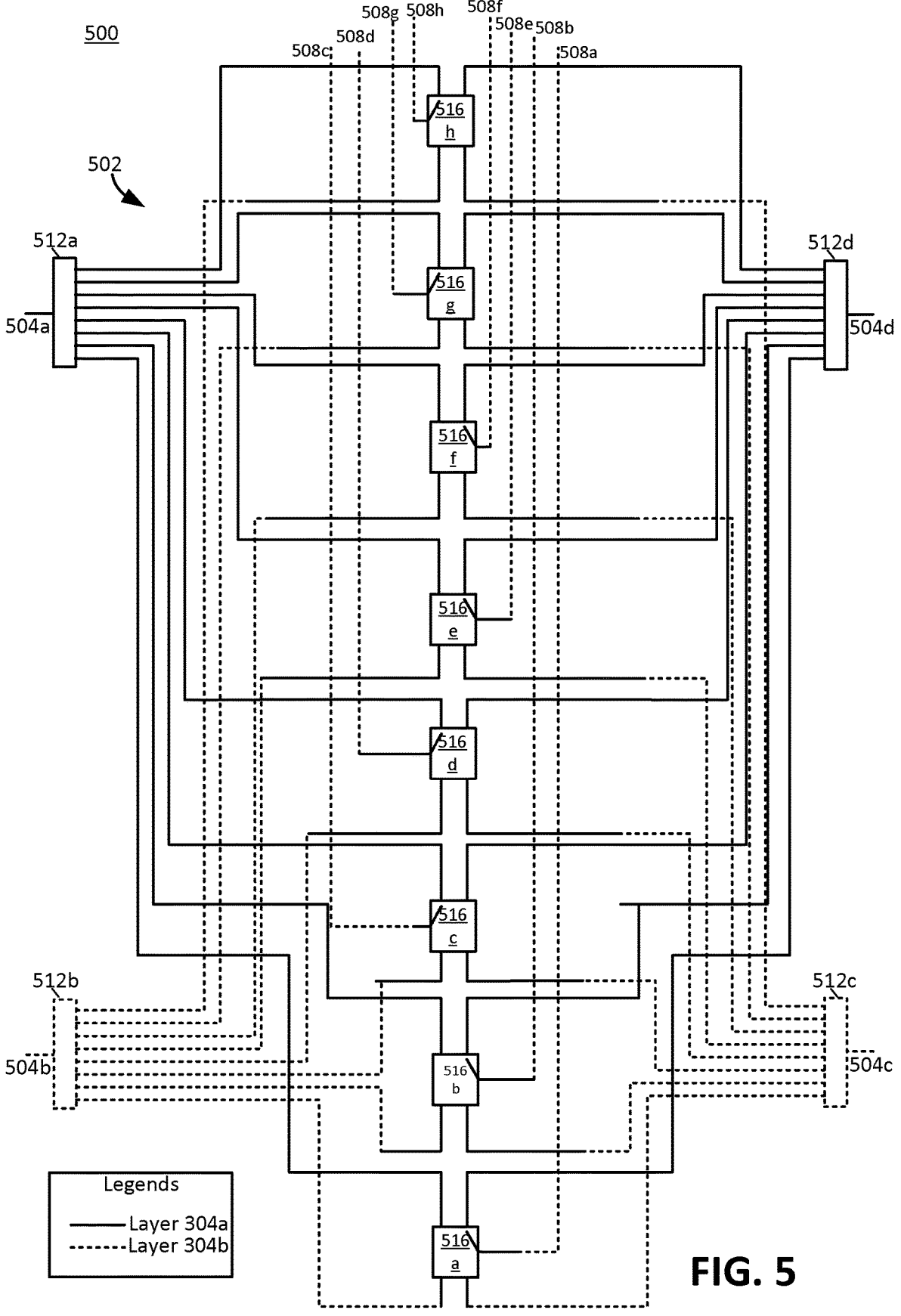
FIG. 5 illustrates a routing layout of an example switch matrix having four input signals, eight output signals, and two routing layers, in accordance with an embodiment of the present disclosure.

FIG. 5 illustrates a routing layout 500 of an example switch matrix 502 having four input signals 504a, . . . , 504d, eight output signals 508a, . . . , 508h, and two routing layers, in accordance with an embodiment of the present disclosure. Similar to the routing layout of FIG. 1, in the routing layout 500, the signal dividers 512a, . . . , 512d are arranged on two sides of a column of the switches 516a, . . . , 516h, such that half the dividers 512a, 512b are on a first side of the switches 516a, . . . 516h and the remaining half the dividers 512c, 512d are on a second side of the switches 516a, . . . 516h. Thus, for example, the dividers 512 are arranged on edges or periphery of the routing layout 500 of the switch matrix 502, and the switches 516 are arranged at or near a central section of the switch matrix 502.

In the switch matrix 502, the number of outputs $N_O$ is eight, and the number of inputs $N_i$ is four. Thus, in accordance with equation 3, the number of routing layers $N_L$ to be used for routing RF signals is at least ⌈4/2⌉, or 2. Thus, at least two routing layers may be used for routing the RF signals (such as the divider output signals, the input signals, and the output signals) of the switch matrix 500. As illustrated in the legends section of FIG. 5, signal lines extending through a first routing layer (such as routing layer 304a of FIG. 3B) are illustrated using solid lines, and signal lines extending through a second routing layer (such as routing layer 304b of FIG. 3B) are illustrated using dotted lines. The routing layout 500 of FIG. 5 will be apparent, based on the description above with respect to FIGS. 1-3.

Figure 6:
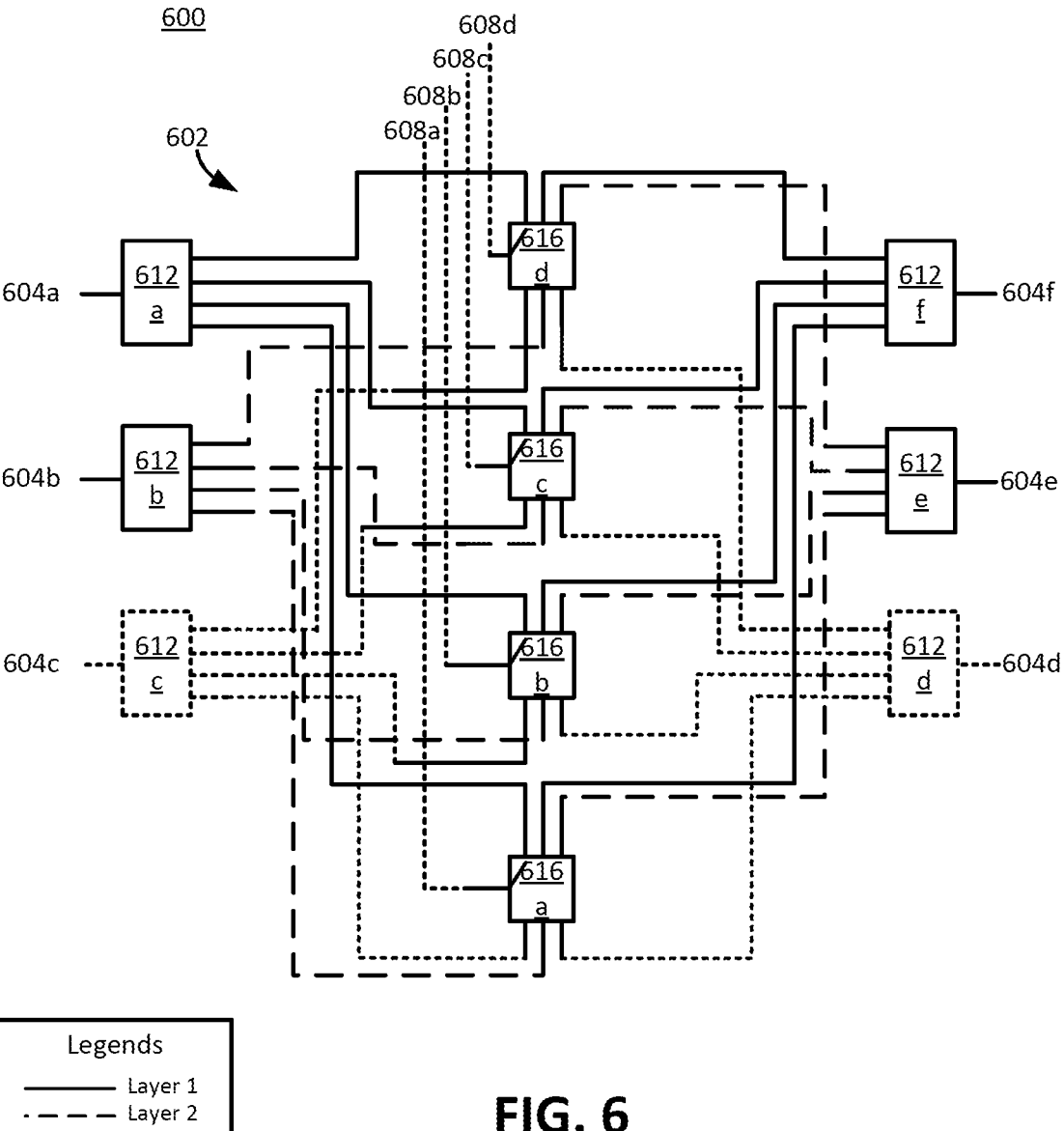
FIG. 6 illustrates a routing layout of an example switch matrix having six input signals, four output signals, and three routing layers, in accordance with an embodiment of the present disclosure.

FIG. 6 illustrates a routing layout 600 of an example switch matrix 602 having six input signals 604a, . . . , 604f, four output signals 608a, . . . , 608d, and three routing layers, in accordance with an embodiment of the present disclosure. Similar to the routing layout 100 of FIG. 1, in the routing layout 600, the signal dividers 612a, . . . , 612f are arranged on two sides of a column of the switches 616a, . . . , 616d, such that some of the dividers 612a, 612b, 612c are on a first side of the switches 616a, . . . , 616d and the remaining dividers 612d, 612e, 612f are on a second side of the switches 616a, . . . , 616d. Thus, for example, the dividers 612 are arranged on edges or periphery of the routing layout 600 of the switch matrix 602, and the switches 616 are arranged at or near a central section of the switch matrix 602.

In the switch matrix 602, the number of outputs $N_O$ is four, and the number of inputs $N_i$ is six. Thus, in accordance with equation 3, the number of routing layers $N_L$ to be used may be ⌈6/2⌉, or 3. Thus, three routing layers may be used for routing the RF signals (such as the divider output signals, the input signals, and the output signals) of the switch matrix 600. As illustrated in the legends section of FIG. 6, signal lines extending through a first routing layer are illustrated using solid lines, signal lines extending through a second routing layer are illustrated using dashed lines, and signal lines extending through a third routing layer are illustrated using dotted lines.

Note that although there are more than two routing layers in the routing layout 600 of FIG. 6, individual ones of the dividers 612 and the switches 616 can be either on an uppermost routing layer or a lowermost routing layer. For example, the dividers 612a, 612b, 612e, 612f and the switches 616a, . . . , 616d are on the first routing layer, and the dividers 612c, 612d are on the second routing layer, where the first routing layer is one of an uppermost or lowermost routing layer, and where the second routing layer is the other of the uppermost the lowermost routing layer. The routing layout 600 of FIG. 6 will be apparent, based on the description above with respect to FIGS. 1-3.

FIG. 7 illustrates a flowchart depicting a method 700 of forming a switch matrix (such as any of the switch matrices 102, 402, 502, or 602 of FIGS. 1 and 4-6), in accordance with an embodiment of the present disclosure.

Referring to FIG. 7, the method 700 includes, at 704, forming a plurality of routing layers (e.g., routing layers illustrated in FIGS. 3A and 3B). In an example, the plurality of routing layers include at least a first routing layer and a second routing layer, such as routing layers 304a and 304b of FIG. 3A, or routing layers 304a and 304d of FIG. 3B. In an example, one of the first and second routing layers is an uppermost routing layer of the plurality of routing layers, and the other of the first and second routing layers is a lowermost routing layer of the plurality of routing layers, as illustrated in FIGS. 3A and 3B. As also illustrated in FIGS. 3A and 3B, the routing layers include interconnect features, such as interconnect features 312 and 314. The routing layers may be formed using techniques for forming routing layers.

Referring again to FIG. 7, the method 700 proceeds from 704 to 708, where a plurality of switches are arranged in a column and on the first routing layer. For example, each of FIGS. 1, 4, 5, and 6 illustrate a column of switches on an uppermost (or lowermost) routing layer. The switches may be formed using techniques for forming such switches.

Referring again to FIG. 7, the method 700 proceeds from 708b to 712, where a plurality of signal dividers are arranged, such that at least a first signal divider and a second signal divider of the plurality of signal dividers are on a first side of the column, and at least a third signal divider and a fourth signal divider of the plurality of signal dividers are on a second side of the column. For example, in FIG. 1, the signal dividers 112a and 112b are on a left side of the column 115 of switches 116, and the signal dividers 112c and 112d are on a right side of the column 115 of switches 116. In an example, the first and third signal dividers are on the first routing layer (e.g., signal dividers 112a, 112d of FIG. 1 are on routing layer 304a), and the second and fourth signal dividers are on the second routing layer (e.g., signal dividers 112b, 112c of FIG. 1 are on routing layer 304b). FIGS. 4, 5, and 6 also illustrate similar arrangements of the signal dividers. For example, in FIG. 4, the signal dividers 412a, . . . , 412d are on a left side of the column 415 of switches 416, and the signal dividers 412e, . . . , 412h are on a right side of the column 415 of switches 416. Also, in FIG. 4, about half the signal dividers on each side of the column are on the first routing layer, and about half the signal dividers are on the second routing layer, as described with respect to FIG. 4. Arranging the switches and the signal dividers in the manner described in the method 700, as well as described above, reduces a number of routing layers and/or via transitions for forming the switch matrix, as described above.

Note that the processes in method 700 are shown in a particular order for ease of description. However, one or more of the processes may be performed in a different order or may not be performed at all (and thus be optional), in accordance with some embodiments. Numerous variations on method 700 and the techniques described herein will be apparent in light of this disclosure.

FURTHER EXAMPLE EMBODIMENTS

The following examples pertain to further embodiments, from which numerous permutations and configurations will be apparent.

Example 1. A switch matrix for planar circuitry, the switching matrix comprising: a plurality of signal dividers, each signal divider configured to receive a corresponding input signal and generate a corresponding plurality of divider output signals; and a plurality of switches, each switch configured to receive a corresponding divider output from a corresponding signal divider, such that each switch receives a corresponding plurality of divider output signals from the plurality of signal dividers, wherein each switch is configured to provide a corresponding output signal such that a plurality of output signals are generated by the plurality of switches; wherein the plurality of switches are arranged in a group, with a first subset of the plurality of signal dividers on a first side of the group, and a second subset of the plurality of signal dividers on a second side of the group.

Example 2. The switch matrix of example 1, wherein the first side of the group is opposite the second side of the group, and wherein no switches of the plurality of switches are on any other side of the group, except the first and second sides of the group.

Example 3. The switch matrix of any one of examples 1-2, further comprising: a plurality of routing layers, each routing layer comprising a corresponding layer of dielectric material and a corresponding plurality of interconnect features extending within the layer of dielectric material, wherein the interconnect features of the routing layers couple the plurality of the signal dividers to the plurality of switches.

Example 4. The switch matrix of example 3, wherein the plurality of routing layers comprise a first routing layer adjacent to a second routing layer, with no routing layers between the first and second routing layers, and wherein the switch matrix further comprises: a conductive material extending between the first routing layer and the second routing layer, the conductive material configured to be grounded.

Example 5. The switch matrix of example 4, wherein the conductive material comprises a ground plane between the first routing layer and the second routing layer, and wherein the signal dividers are radio frequency (RF) signal dividers and the switches are RF switches.

Example 6. The switch matrix of any one of examples 4-5, further comprising: a conductive via structure coupled between a first interconnect feature within the first routing layer and a second interconnect feature within the second routing layer, wherein the via extends through an opening within the conductive material, without contacting the conductive material.

Example 7. The switch matrix of any one of examples 3-6, wherein: the plurality of routing layers includes at least an upper routing layer, and a lower routing layer below the upper routing layer; the first subset of the plurality of signal dividers on the first side of the group includes at least a first signal divider and a second signal divider; the second subset of the plurality of signal dividers on the second side of the group includes at least a third signal divider and a fourth signal divider; and the first and third signal dividers are on the upper routing layer, and the second and fourth signal dividers are on the lower routing layer.

Example 8. The switch matrix of example 7, wherein: a first switch of the plurality of switches is on the upper routing layer; a first divider output signal from the first signal divider to the first switch and a third divider output signal from the third signal divider to the first switch are routed entirely through the upper routing layer and not through any other routing layer; and a second divider output signal from the second signal divider to the first switch and a fourth divider output signal from the fourth signal divider to the first switch are routed through the upper and lower routing layers.

Example 9. The switch matrix of example 8, wherein: the plurality of routing layers further includes an intermediate routing layer between the upper and lower routing layers; and the second divider output signal and the fourth divider output signal are further routed through the intermediate routing layer.

Example 10. The switch matrix of any one of examples 3-9, wherein: a number of routing layers within the plurality of routing layers is NL, and a number of signal dividers within the plurality of signal dividers is $N_i$; and NL is equal to $\lceil N_i/2 \rceil$, where $\lceil \ldots \rceil$ represents the ceiling function.

Example 11. The switch matrix of any one of examples 1-10, wherein the group of switches includes or is a column of switches, and wherein: the first side of the column is opposite the second side of the column; a third side of the column is perpendicular to the first side of the column, and a fourth side of the column is opposite the third side of the column; and a plurality of outputs from the plurality of switches are routed towards the third or fourth side of the column, and not towards the first or second side of the column.

Example 12. The switch matrix of claim 1, wherein: the group of switches are arranged along a horizontal plane; a first switch of the group of switches has (i) one or more second switches on a first side (ii) one or more third switches on a second side opposite the first side, and (iii) no switches on a third side and a fourth side that are perpendicular to the first and second sides; and the first, second, third, and fourth sides of the first switch are on the horizontal plane.

Example 12a. A printed circuit board (PCB) or printed wiring board (PWB) comprising the switch matrix of any one of examples 1-11.

Example 13. An integrated circuit comprising the switch matrix of any one of examples 1-12.

Example 14. A switch matrix comprising: a plurality of routing layers including at least a first routing layer and a second routing layer, wherein one of the first and second routing layers is an uppermost routing layer of the plurality of routing layers, and the other of the first and second routing layers is a lowermost routing layer of the plurality of routing layers; a plurality of switches arranged in a column and on the first routing layer; and a plurality of signal dividers, such that a first signal divider and a second signal divider of the plurality of signal dividers are on a first side of the column, and a third signal divider and a fourth signal divider of the plurality of signal dividers are on a second side of the column, wherein the first and third signal dividers are on the first routing layer, and the second and fourth signal dividers are on the second routing layer; wherein the plurality of routing layers comprise a plurality of interconnect features to couple each switch of the plurality of switches of each signal divider of the plurality of signal dividers.

Example 15. The switch matrix of example 14, wherein: the plurality of routing layers include at least a third routing layer between the first routing layer and the second routing layer; and a first conductive ground plane between the first and third routing layers, and a second conductive ground plane between the third and second routing layers.

Example 16. The switch matrix of any one of examples 14-15, wherein the first side of the column is opposite the second side of the column, and wherein no switches of the plurality of switches of the switch matrix is on any other side of the column, except the first and second sides of the column.

Example 17. The switch matrix of any one of examples 14-16, further comprising: a plurality of outputs corresponding to the plurality of the switches, wherein each of the plurality of outputs exit the corresponding plurality of switches from the first routing layer, and then transition to the second routing layer.

Example 18. The switch matrix of example 17, wherein a first output of the plurality of outputs from a first switch of the plurality of the switches transition from the first routing layer to the second routing layer using one or more conductive vias that extend between two or more routing layers.

Example 19. A printed circuit board (PCB) or printed wiring board (PWB) comprising the switch matrix of any one of examples 13-18.

Example 20. An integrated circuit comprising the switch matrix of any one of examples 13-19.

Example 21. A method of forming a switch matrix, comprising: forming a plurality of routing layers including at least a first routing layer and a second routing layer, wherein one of the first and second routing layers is an uppermost routing layer of the plurality of routing layers, and the other of the first and second routing layers is a lowermost routing layer of the plurality of routing layers; arranging a plurality of switches in a column and on the first routing layer; and arranging a plurality of signal dividers, such that a first signal divider and a second signal divider of the plurality of signal dividers are on a first side of the column, and a third signal divider and a fourth signal divider of the plurality of signal dividers are on a second side of the column, wherein the first and third signal dividers are on the first routing layer, and the second and fourth signal dividers are on the second routing layer; wherein the plurality of routing layers comprise a plurality of interconnect features to couple each switch of the plurality of switches of each signal divider of the plurality of signal dividers.

Example 22. The method of example 21, wherein: a number of routing layers within the plurality of routing layers is NL, and a number of signal dividers within the plurality of signal dividers is $N_i$; and NL is equal to $\lceil N_i/2 \rceil$, where $\lceil \ldots \rceil$ represents the ceiling function.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A switch matrix for planar circuitry, the switching matrix comprising:

a plurality of signal dividers, each signal divider configured to receive a corresponding input signal and generate a corresponding plurality of divider output signals;

a plurality of switches, each switch configured to receive a corresponding divider output from a corresponding signal divider, such that each switch receives a corresponding plurality of divider output signals from the plurality of signal dividers, wherein each switch is configured to provide a corresponding output signal such that a plurality of output signals are generated by the plurality of switches; and a plurality of routing layers, each routing layer comprising a corresponding layer of dielectric material and a corresponding plurality of interconnect features extending within the layer of dielectric material, wherein the interconnect features of the routing layers couple the plurality of the signal dividers to the plurality of switches;

wherein the plurality of switches are arranged in a group, with a first subset of the plurality of signal dividers on a first side of the group, and a second subset of the plurality of signal dividers on a second side of the group;

wherein the plurality of routing layers comprise a first routing layer adjacent to a second routing layer, with no routing layers between the first and second routing layers, and wherein the switch matrix further comprises:

a conductive material extending between the first routing layer and the second routing layer, the conductive material configured to be grounded.

2. The switch matrix of claim 1, wherein the first side of the group is opposite the second side of the group, and wherein no switches of the plurality of switches are on any other side of the group, except the first and second sides of the group.

3. The switch matrix of claim 1, wherein the conductive material comprises a ground plane between the first routing layer and the second routing layer, and wherein the signal dividers are radio frequency (RF) signal dividers and the switches are RF switches.

4. The switch matrix of claim 1, further comprising:

a conductive via structure coupled between a first interconnect feature within the first routing layer and a second interconnect feature within the second routing layer, wherein the via extends through an opening within the conductive material, without contacting the conductive material.

5. The switch matrix of claim 1, wherein:

the plurality of routing layers includes at least an upper routing layer, and a lower routing layer below the upper routing layer;

the first subset of the plurality of signal dividers on the first side of the group includes at least a first signal divider and a second signal divider;

the second subset of the plurality of signal dividers on the second side of the group includes at least a third signal divider and a fourth signal divider; and the first and third signal dividers are on the upper routing layer, and the second and fourth signal dividers are on the lower routing layer.

6. The switch matrix of claim 5, wherein:

a first switch of the plurality of switches is on the upper routing layer;

a first divider output signal from the first signal divider to the first switch and a third divider output signal from the third signal divider to the first switch are routed entirely through the upper routing layer and not through any other routing layer; and a second divider output signal from the second signal divider to the first switch and a fourth divider output signal from the fourth signal divider to the first switch are routed through the upper and lower routing layers.

7. The switch matrix of claim 6, wherein:

the plurality of routing layers further includes an intermediate routing layer between the upper and lower routing layers; and the second divider output signal and the fourth divider output signal are further routed through the intermediate routing layer.

8. The switch matrix of claim 1, wherein:

a number of routing layers within the plurality of routing layers is $N_L$, and a number of signal dividers within the plurality of signal dividers is $N_i$; and $N_L$ is equal to $\lceil N_i/2 \rceil$, where $\lfloor \ldots \rceil$ represents the ceiling function.

9. The switch matrix of claim 1, wherein the group of switches includes or is a column of switches, and wherein:

the first side of the column is opposite the second side of the column;

a third side of the column is perpendicular to the first side of the column, and a fourth side of the column is opposite the third side of the column; and a plurality of outputs from the plurality of switches are routed towards the third or fourth side of the column, and not towards the first or second side of the column.

10. The switch matrix of claim 1, wherein:

the group of switches are arranged along a horizontal plane;

a first switch of the group of switches has (i) one or more second switches on a first side (ii) one or more third switches on a second side opposite the first side, and (iii) no switches on a third side and a fourth side that are perpendicular to the first and second sides; and the first, second, third, and fourth sides of the first switch are on the horizontal plane.

11. A printed circuit board (PCB) or printed wiring board (PWB) comprising the switch matrix of claim 1.

12. A method of forming a switch matrix, comprising:

forming a plurality of routing layers including at least a first routing layer and a second routing layer, wherein one of the first and second routing layers is an uppermost routing layer of the plurality of routing layers, and the other of the first and second routing layers is a lowermost routing layer of the plurality of routing layers;

arranging a plurality of switches in a column and on the first routing layer; and arranging a plurality of signal dividers, such that a first signal divider and a second signal divider of the plurality of signal dividers are on a first side of the column, and a third signal divider and a fourth signal divider of the plurality of signal dividers are on a second side of the column, wherein the first and third signal dividers are on the first routing layer, and the second and fourth signal dividers are on the second routing layer;

wherein the plurality of routing layers comprise a plurality of interconnect features to couple each switch of the plurality of switches of each signal divider of the plurality of signal dividers;

wherein a number of routing layers within the plurality of routing layers is $N_L$, and a number of signal dividers within the plurality of signal dividers is $N_i$; and $N_L$ is equal to $\lceil N_i/2 \rceil$, where $\lceil \ldots \rceil$ represents the ceiling function.

* * * * *